United States Patent
Weeks et al.

(10) Patent No.: US 10,679,523 B2
(45) Date of Patent: Jun. 9, 2020

(54) TAMPER INDICATING SEAL

(71) Applicant: Savannah River Nuclear Solutions, LLC, Aiken, SC (US)

(72) Inventors: George E. Weeks, Aiken, SC (US); Keith Tolk, Aiken, SC (US); Jennifer E. Tanner, Aiken, SC (US); Jacob Benz, Aiken, SC (US); Keir C. Allen, Aiken, SC (US); Helen M. White, Aiken, SC (US); Daniel Krementz, Aiken, SC (US); Lawrence J. Harpring, Aiken, SC (US); Raymond R. Lawson, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 945 days.

(21) Appl. No.: 15/219,388

(22) Filed: Jul. 26, 2016

(65) Prior Publication Data
US 2018/0033341 A1 Feb. 1, 2018

(51) Int. Cl.
*G06K 19/06* (2006.01)
*G06K 7/14* (2006.01)
(Continued)

(52) U.S. Cl.
CPC ......... *G09F 3/0352* (2013.01); *G06K 7/1447* (2013.01); *G09F 3/0317* (2013.01);
(Continued)

(58) Field of Classification Search
CPC .... G09F 3/0352; G09F 3/0382; G09F 3/0376; G09F 3/0317; G09F 2003/0239; G06K 7/1447
See application file for complete search history.

(56) References Cited

U.S. PATENT DOCUMENTS

| 4,523,186 A | 6/1985 | Fiarman |
| 5,169,188 A | 12/1992 | Kupperman et al. |

(Continued)

FOREIGN PATENT DOCUMENTS

WO  WO 2004/085045  10/2004

OTHER PUBLICATIONS

Christos Makris, et al.; Tags and Seals for Controlling Nuclear Materials; Arms Control and Nonproliferation Technologies; Department of Energy/Office of Intelligence and National Security; DOE/AN/ACNT-93A; Livermore, California; Second Quarter 1993; pp. 1-30.

(Continued)

*Primary Examiner* — Kristina R Fulton
*Assistant Examiner* — Thomas L Neubauer
(74) *Attorney, Agent, or Firm* — Dority & Manning, P.A.

(57) ABSTRACT

A system and method for detecting tampering with a seal is provided. A loop seal tamper indicating device includes a seal wire that may be passed through a secured item or container to form a loop with the free ends of the seal wire passing through a seal housing. A plunger body including an adhesive-filled cavity is inserted into the seal housing, such that a piston expresses the adhesive into the space between the seal housing and the plunger body. The adhesive may contain reflective particles and is cured to fix the particles and the adhesive in place. A reference image may be taken to record the unique identifier and reflective signature of the adhesive. Future validation images may be compared to the reference image to determine whether the reflective signature has changed, thus indicating that the seal has been tampered with.

19 Claims, 7 Drawing Sheets

(51) Int. Cl.
*G09F 3/03* (2006.01)
*G09F 3/02* (2006.01)

(52) U.S. Cl.
CPC .......... *G09F 3/0376* (2013.01); *G09F 3/0382* (2013.01); *G09F 2003/0239* (2013.01)

(56) References Cited

U.S. PATENT DOCUMENTS

| | | |
|---|---|---|
| 5,762,386 A | 6/1998 | Fuehrer |
| 5,858,500 A | 1/1999 | MacPherson |
| 6,293,599 B1 | 9/2001 | Garcia |
| 6,394,022 B1 | 5/2002 | Johnston et al. |
| 6,553,930 B1 | 4/2003 | Johnston et al. |
| 6,588,812 B1 | 7/2003 | Garcia et al. |
| 6,888,241 B1 | 5/2005 | Korn et al. |
| 7,353,994 B2 | 4/2008 | Farrall et al. |
| 7,427,020 B2 | 9/2008 | Haraszti et al. |
| 8,186,731 B1 | 5/2012 | Romero et al. |
| 9,472,125 B2 * | 10/2016 | Debrody ............... G09F 3/0317 |
| 9,652,703 B1 * | 5/2017 | Merkle .................... B32B 7/00 |
| 2004/0032093 A1 * | 2/2004 | Razavi ............... B01L 3/50853 |
| | | 277/628 |
| 2005/0116464 A1 | 6/2005 | Isherwood et al. |
| 2010/0308606 A1 * | 12/2010 | de Lima Castro .... G09F 3/0311 |
| | | 292/307 R |
| 2014/0054190 A1 * | 2/2014 | Bransgrove ........ G01N 27/3272 |
| | | 206/409 |

OTHER PUBLICATIONS

Kenneth Ystesund, et al.; Python Fiber Optic Seal; Sandia National Laboratories, Albuquerque, New Mexico (supported by the U.S. Department of Energy); Aug. 1, 1993; pp. 1-5.

Benny J. Hill, et al; Tagging RDT&E; vol. 1—Technology Assessments and Development Reports; BDM Federal, Inc., Albuquerque, New Mexico/Defense Nuclear Agency, Alexandria, Virginia; Mar. 1994; pp. 1-358.

* cited by examiner

TAMPER INDICATING SEAL

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present subject matter relates generally to tamper indicating devices, or more specifically, to improved loop seal tamper indicating devices.

BACKGROUND OF THE INVENTION

Tamper indicating devices (TIDs) are devices or materials designed to leave permanent evidence of unauthorized access to an item or container. TIDs are used in a wide variety of applications, such as arms control treaty verification and hazardous waste management. In this regard, TIDs may provide a treaty verifier or inspector a means to detect attempts to divert nuclear material or tamper with equipment. In addition TIDs may be used to secure high value assets, information, or equipment being shipped, used, or stored in potentially hostile or unsecure locations. Other commercial applications could include providing tamper indication for shipping containers, safes or vaults, sensitive electrical distribution grid assets, sensitive equipment such as electronic polling machines, etc.

There are a number of passive seals and tamper indicating devices currently available on the market. One such type of passive seal is a loop seal. A loop seal is designed to capture the ends of a seal wire, which is a cable that must be disconnected or cut for access to the container, item, or component being sealed. However, conventional loop seals are simple mechanical devices that can be easily defeated and are not suitable for use on high value assets. For example, conventional loop seals may be vulnerable to rapid, simple, low-tech attacks, which may result in an attacker gaining entry or access to the sealed item or container without being detected.

Accordingly, a tamper indicating device that provides features for cost-effective, reliable tamper detection would be useful. More particularly, a loop seal TID that provides improved security while decreasing the potential for counterfeiting or undetected tampering would be especially beneficial.

BRIEF DESCRIPTION OF THE INVENTION

The present subject matter provides a system and method for detecting tampering with a seal. A loop seal tamper indicating device includes a seal wire that may be passed through a secured item or container to form a loop with the free ends of the seal wire passing through a seal housing. A plunger body including an adhesive-filled cavity is inserted into the seal housing, such that a piston expresses the adhesive into the space between the seal housing and the plunger body. The adhesive may contain reflective particles and is cured to fix the particles and the adhesive in place. A reference image may be taken to record the unique identifier and reflective signature of the adhesive. Future validation images may be compared to the reference image to determine whether the reflective signature has changed, thus indicating that the seal has been tampered with. Additional aspects and advantages of the invention will be set forth in part in the following description, or may be apparent from the description, or may be learned through practice of the invention.

In one exemplary embodiment, a loop seal tamper indicating device is provided. The loop seal tamper indicating device includes a seal wire and a seal housing for receiving the seal wire, the seal housing defining a plunger chamber. A plunger body is configured for inserting into the plunger chamber, the plunger body defining an adhesive cavity containing an adhesive. A piston is positioned within the seal housing, the piston being configured for engaging the adhesive cavity to express the adhesive from the adhesive cavity and into the plunger chamber when the plunger body is inserted into the seal housing.

In another exemplary embodiment, a method for detecting tampering with a seal is provided. The method includes passing a seal wire through a seal housing, the seal housing including a piston and defining a plunger chamber. A plunger body is inserted into the plunger chamber, the piston expressing an adhesive from an adhesive cavity defined by the plunger body into a space between the plunger body and the seal housing. The adhesive is cured to generate a unique identifier and a reference image and a validation image of the seal housing and the unique identifier are obtained. The reference image is then compared to the validation image to determine if the unique identifier has changed.

According to still another exemplary embodiment, a tamper indication system is provided. The tamper indication system generally includes a loop seal tamper indicating device and a seal reader assembly. The loop seal tamper indicating device includes a seal wire and a seal housing for receiving the seal wire, the seal housing including a piston and defining a plunger chamber. A plunger body is configured for inserting into the plunger chamber, the plunger body defining an adhesive cavity containing an adhesive, the piston being configured for engaging the adhesive cavity to express the adhesive from the adhesive cavity into the plunger chamber when the plunger body is inserted into the seal housing. The seal reader assembly includes a lighting assembly that illuminates the seal housing at one or more angles and a camera assembly that takes images of the illuminated seal housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
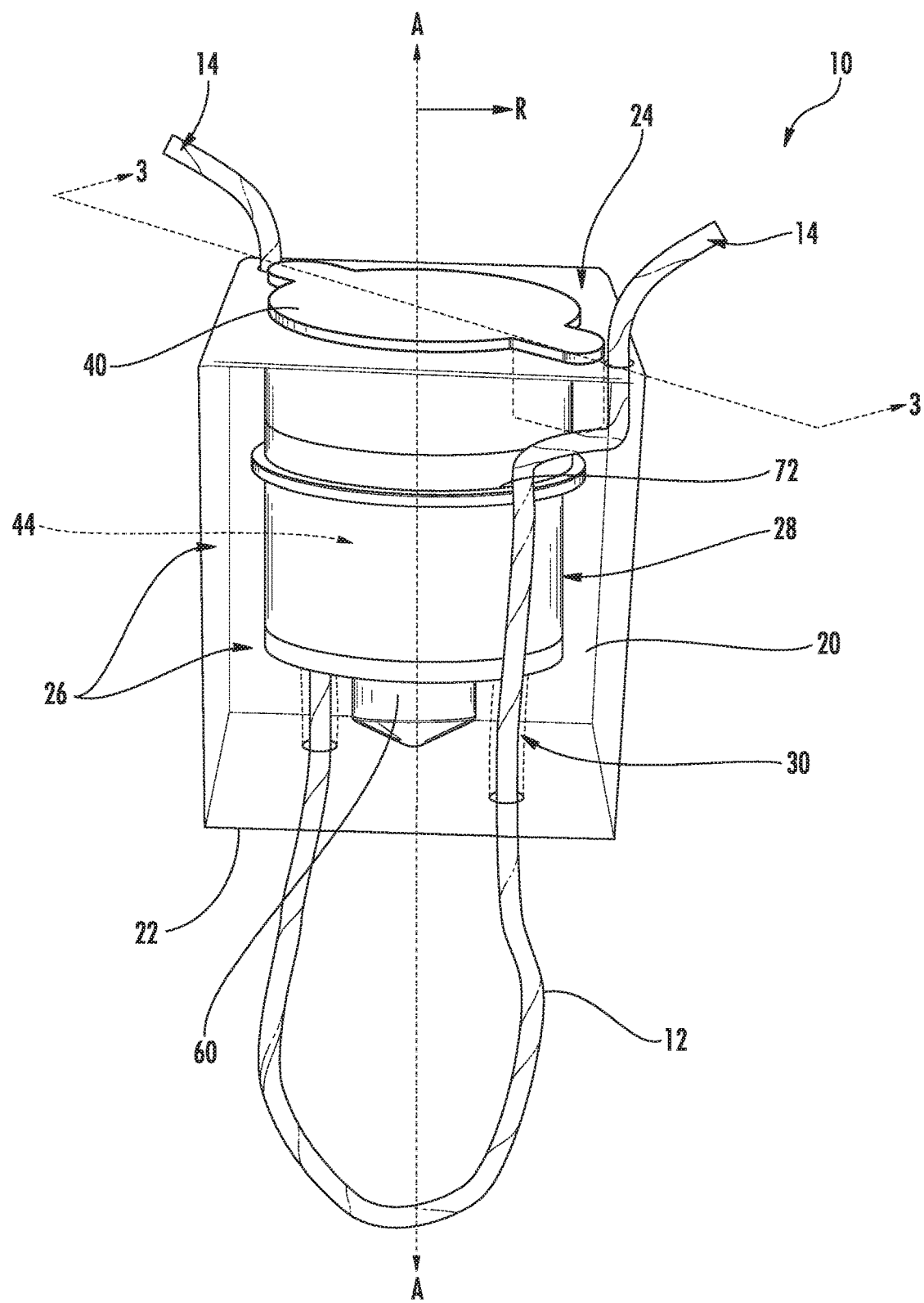
FIG. 1 provides a perspective view of a loop seal tamper indicating device according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
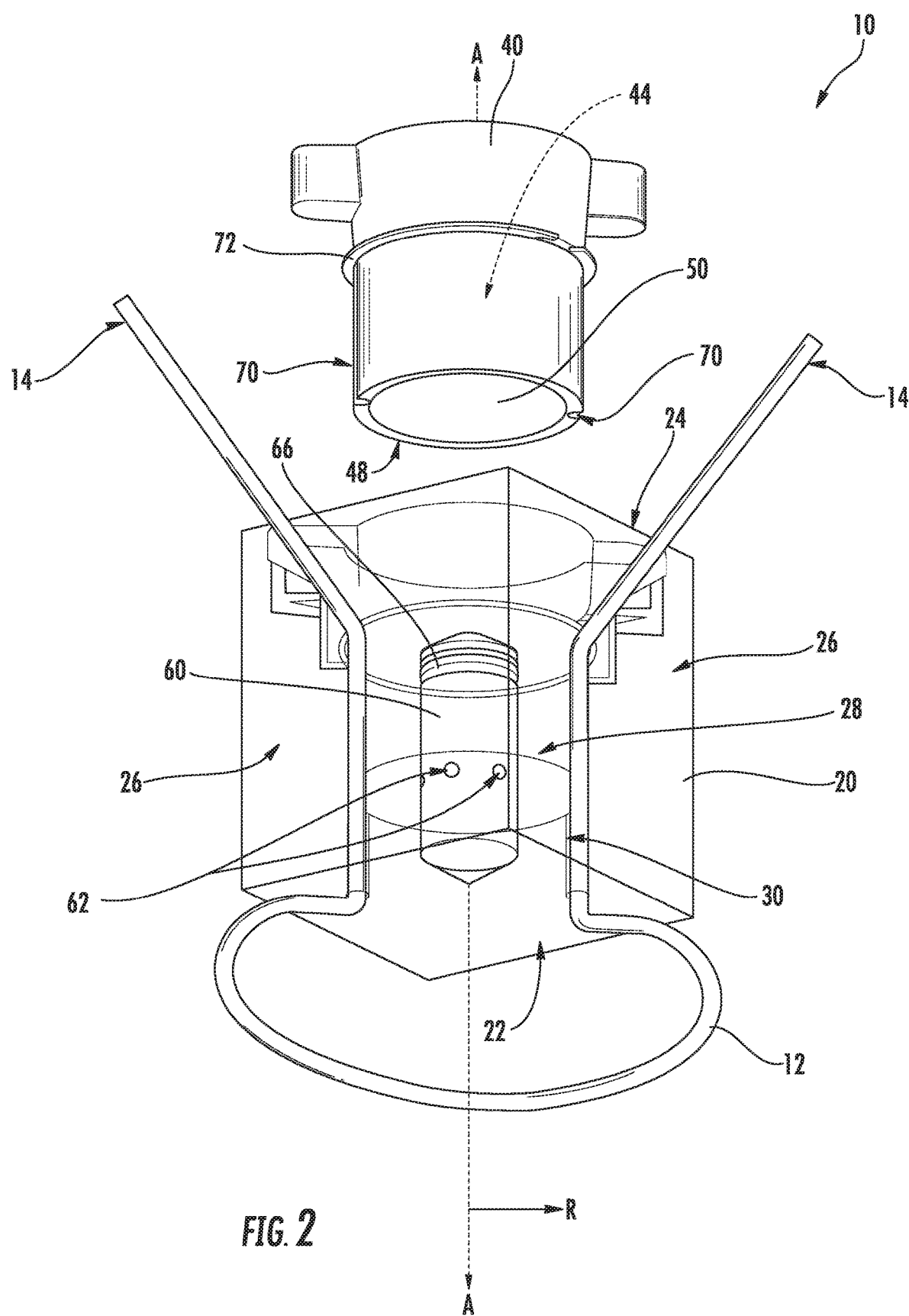
FIG. 2 provides an exploded perspective view of the exemplary loop seal tamper indicating device of FIG. 1.
Figure 3:
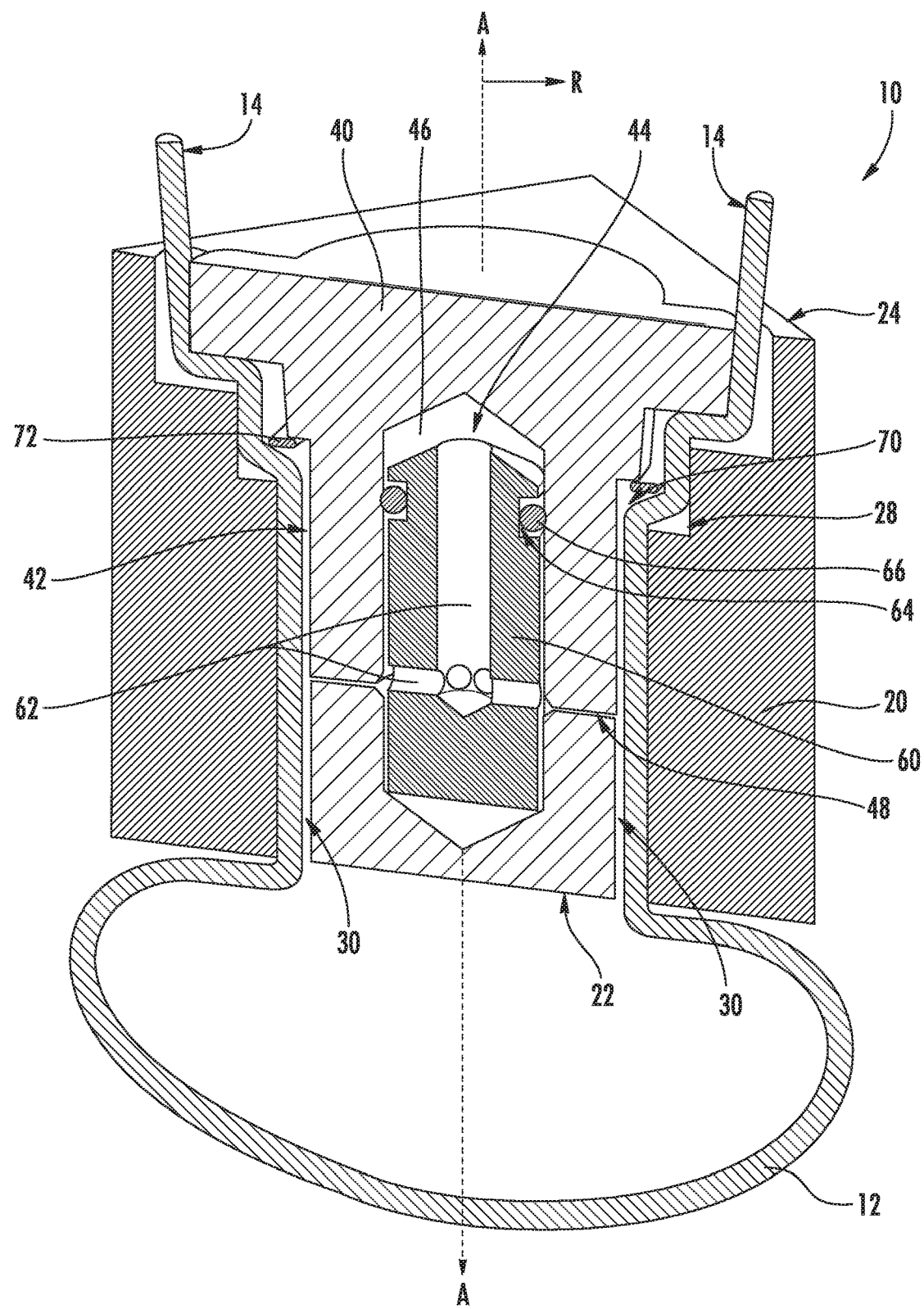
FIG. 3 provides a cross sectional view of the exemplary loop seal tamper indicating device of FIG. 1, taken along Line 3-3 of FIG. 1.

FIGS. 1 through 3 depict an exemplary loop seal tamper indicating device 10 (referred to hereafter as "tamper indicating device 10") according to an exemplary embodiment of the present disclosure. More specifically, FIGS. 1 through 3 provide perspective, exploded, and cross sectional views of tamper indicating device 10, respectively. According to the illustrated exemplary embodiment, tamper indicating device 10 defines an axial direction A and a radial direction R.

As illustrated, tamper indicating device 10 includes a seal wire 12 formed into a loop having two free ends 14. As discussed briefly above, one free end 14 of seal wire 12 may be passed through an item or container such that the loop prevents the opening of the container or the accessing of the item without providing an irreversible indication on tamper indicating device 10. For example, a container of hazardous material may have a lid that is secured by a hasp or another latching mechanism having a hole that may receive seal wire 12. By passing seal wire 12 through the hole and securing free ends 14 of seal wire 12, the lid may not be removed, and thus the hazardous material within the container may not be accessed, without cutting seal wire 12 or otherwise providing an indication on tamper indicating device 10.

According to the illustrated embodiment, seal wire 12 is constructed of plastic coated stainless steel. However, according to alternative embodiments, any suitably flexible rope or wire could be used as seal wire 12. For example, seal wire 12 could be a fiber optic cable, a plastic rod, a fabric rope, or a composite material. According to still other exemplary embodiments, seal wire 12 need not be flexible, but could instead be a rigid rod formed into a U-shape. In addition, alternative exemplary embodiments may include a net or a cage that is configured to receive the container, item, or component to be sealed. The net or the cage may include multiple loose ends that could terminate and be embedded within seal housing 20 in a manner similar to that described for seal wire 12, thereby sealing the item within the net or cage. It should be appreciated that other configurations are also possible and within the scope of the present subject matter.

Tamper indicating device 10 may further include a seal housing 20 which is configured for receiving free ends 14 of seal wire 12. According to the illustrated embodiment, seal housing 20 is a transparent cube that extends between a first end 22 and a second end 24 along the axial direction A. In addition, seal housing includes four sides 26. For reasons described below, seal housing 20 may be constructed from a transparent or translucent material, such as polymethyl methacrylate (PMMA), or acrylic glass such as Plexiglas. More specifically, according to the illustrated embodiment, seal housing 20 is made from clear PMMA plastic with polished faces.

Seal housing 20 defines a plunger chamber 28 that extends along the axial direction A from second end 24 toward first end 22 of seal housing 20. Seal housing 20 further defines two channels 30, each channel 30 extending from first end 22 through seal housing 20 to plunger chamber 28 along the axial direction A. Although plunger chamber 28 and channels 30 are described herein as extending along the axial direction A, it should be appreciated that such a construction is used only for the purpose of explaining aspects of the present subject matter and that other constructions may be used while remaining within the scope of the present subject matter.

To secure an item or container using tamper indicating device 10, free ends 14 of seal wire 12 may be passed through the item, into channels 30, and through plunger chamber 28 such that a continuous loop is formed through the item. Tamper indicating device 10 further includes a plunger body 40 that is configured for inserting into plunger chamber 28. According to the illustrated embodiment, plunger chamber 28 and plunger body 40 are substantially cylindrical. Plunger chamber 28 has a slightly larger inner diameter than the outer diameter of plunger body 40, such that an annular chamber 42 is defined between the two when plunger body 40 is inserted into plunger chamber 28.

Plunger body 40 also defines an adhesive cavity 44 that is at least partially filled with an adhesive 46. More specifically, according to the illustrated exemplary embodiment, adhesive cavity 44 is a substantially cylindrical chamber extending along the axial direction A from an opening defined on a bottom 48 of plunger body 40. According to an exemplary embodiment, adhesive 46 may be contained in adhesive cavity 44 using a penetrable seal 50 (such as aluminum foil) that is positioned along bottom 48 of plunger body 40 and defines at least a portion of adhesive cavity 44. For example, penetrable seal 50 may be glued to plunger body 40 during the manufacturing process of tamper indicating device 10, e.g., after the adhesive 46 has been inserted into adhesive cavity 44.

Plunger body 40 may be made from any suitably rigid material. For example, plunger body 40 may be made from polycarbonate (PC), acrylonitrile butadiene styrene (ABS), or a composite PC/ABS plastic. In addition, plunger body 40 may be rapid prototyped, injection molded, or manufactured using any other suitable process. According to the illustrated embodiment, plunger body 40 is black so as to make the distribution of adhesive 36 and reflective particles readily visible from outside seal housing 20.

Tamper indicating device 10 may further include a piston 60 positioned within seal housing 20. Piston 60 may be separate from or integrally formed with seal housing 20. According to the illustrated embodiment, piston 60 is substantially cylindrical, is fixed to a bottom of plunger chamber 28, and extends along the axial direction A. In this manner, piston 60 may be configured for puncturing penetrable seal 50 and engaging adhesive cavity 44 to express adhesive 46 when plunger body 40 is inserted into seal housing 20. The expressed adhesive 46 is displaced by piston 60 such that it flows out of adhesive cavity 44 and into plunger chamber 28. More specifically, adhesive 46 flows such that it at least partially fills annular chamber 42 defined between plunger body 40 and seal housing 20.

As best illustrated in FIG. 3, piston 60 defines one or more flow passageways 62 to allow adhesive 46 to exit adhesive cavity 44 and be discharged into plunger chamber 28. For example, flow passageway 62 may extend from a distal end of piston 60 along the axial direction A to a base of piston 60 where it meets seal housing 20. In this manner, as plunger body 40 is inserted into plunger chamber 28 and piston 60 advances into adhesive cavity 44, adhesive 46 flows through flow passageway 62 into plunger chamber 28, and more specifically, into annular chamber 42. Piston 60 may further define a circumferential ridge 64 about its end that is configured to receive an O-ring seal 66. O-ring seal 66 provides a fluid seal between piston 60 and plunger body 40 such that all of the adhesive 46 within adhesive cavity 44 is urged through flow passageway 62. However, it should be appreciated that alternative embodiments may not include circumferential ridge 64 and/or O-ring seal 66.

Plunger body 40 may further define axially extending slots 70 that are configured to receive seal wire 12. Axially extending slots 70 are defined on an outer surface of plunger body such that they open up into annular chamber 42. In this manner, axially extending slots 70 provide extra space for receiving seal wire 12. However, according to alternative embodiments, axially extending slots 70 are not needed, and seal wire 12 may instead be positioned directly through annular chamber 42.

According to still another exemplary embodiment, a snap ring 72 may be positioned around plunger body 40 such that it engages seal wire 12 as plunger body 40 is inserted into plunger chamber 28. Snap ring 72 may be constructed from stainless steel and may extend circumferentially around plunger body 40. In this manner, snap ring 72 prevents seal wire 12 from being removed from seal housing 20 without damaging tamper indicating device 12 and further serves to secure plunger body 40 within plunger chamber 28.

After plunger body 40 is inserted in seal housing 20 and adhesive 46 fills annular chamber 42, the adhesive 46 is cured to fix seal wire 12 and plunger body 40, and to generate a unique identifier for tamper indicating seal 10. For example, adhesive 46 may be an ultraviolet (UV) adhesive that is cured using UV light. Notably, the distribution of adhesive 46 within plunger chamber 28 and annular chamber 42 creates a unique pattern or signature that is detectable through the transparent seal housing 20. Moreover, according to an exemplary embodiment, the adhesive 46 includes reflective particles, such as hematite, that form a unique identifier that is fixed when the adhesive 46 is cured. In this manner, a unique identifier or "fingerprint" is formed by tamper indicating device 10 upon assembly. Any attempts to remove seal wire 12, open the sealed container or item, or otherwise tamper with tamper indicating device 10 would destroy the fingerprint and thus provide an indication of tampering. Although adhesive 46 is described above as including reflective hematite particles, it should be appreciated that this exemplary adhesive is only used for the purpose of explanation. According to alternative embodiments, any adhesive suitable for generating a unique identifier may be used while remaining within the scope of the present subject matter.

Moreover, according to another exemplary embodiment, each side 26 of seal housing 20 may include a unique bar code embedded within seal housing 20. Each bar code may be captured in an image or may be otherwise associated with the unique identifier described above for each respective side 26 of seal housing 20. In this manner, the bar codes provide a reference that the reader may use to identify a particular side 26 and simplify comparison of a reference image and a validation image, which will be described in more detail below.

Figure 4:
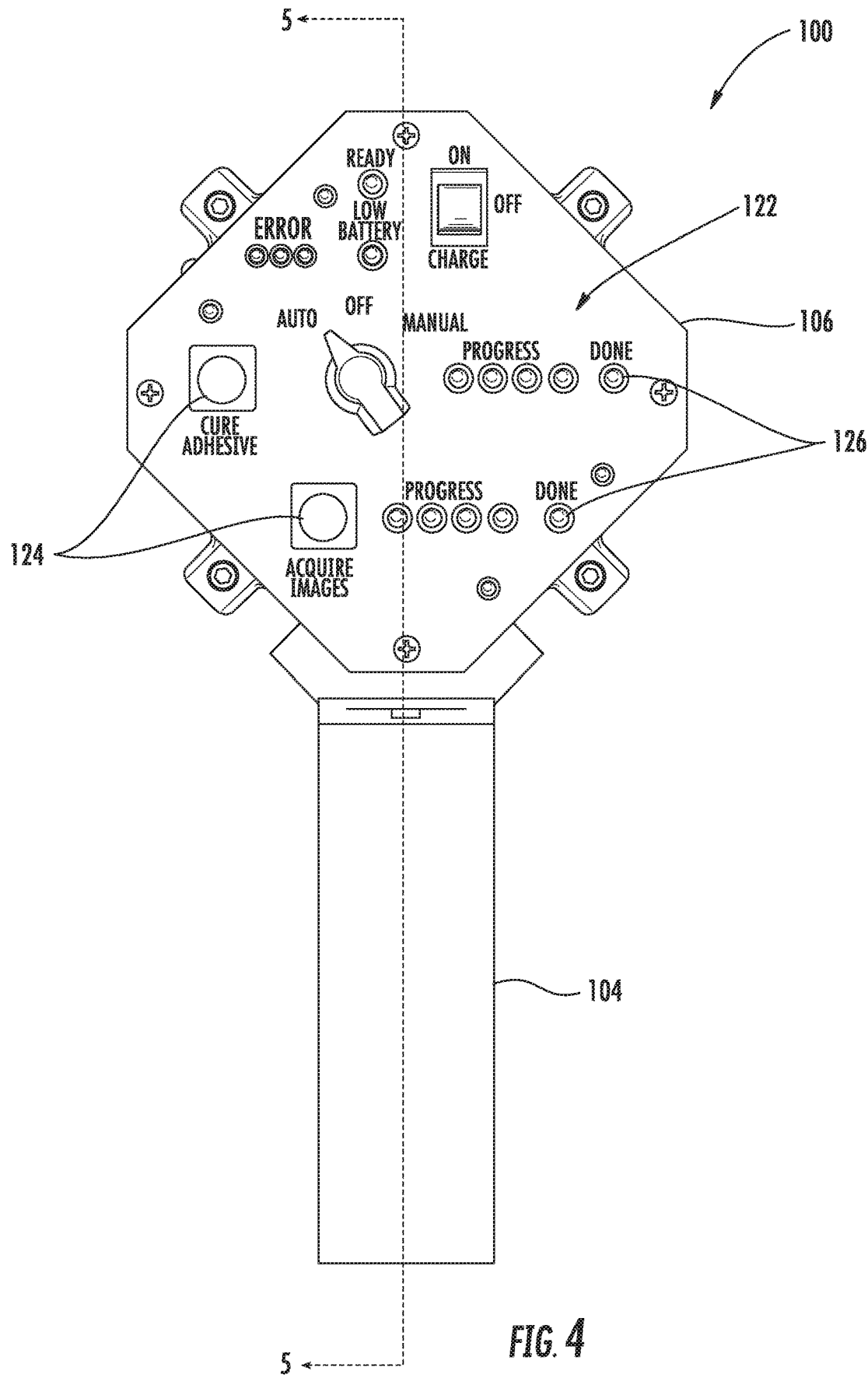
FIG. 4 provides a front view of a seal reader assembly that may be used to cure an adhesive of the exemplary loop seal tamper indicating device of FIG. 1 and take images of the cured adhesive according to an exemplary embodiment of the present subject matter.
Figure 5:
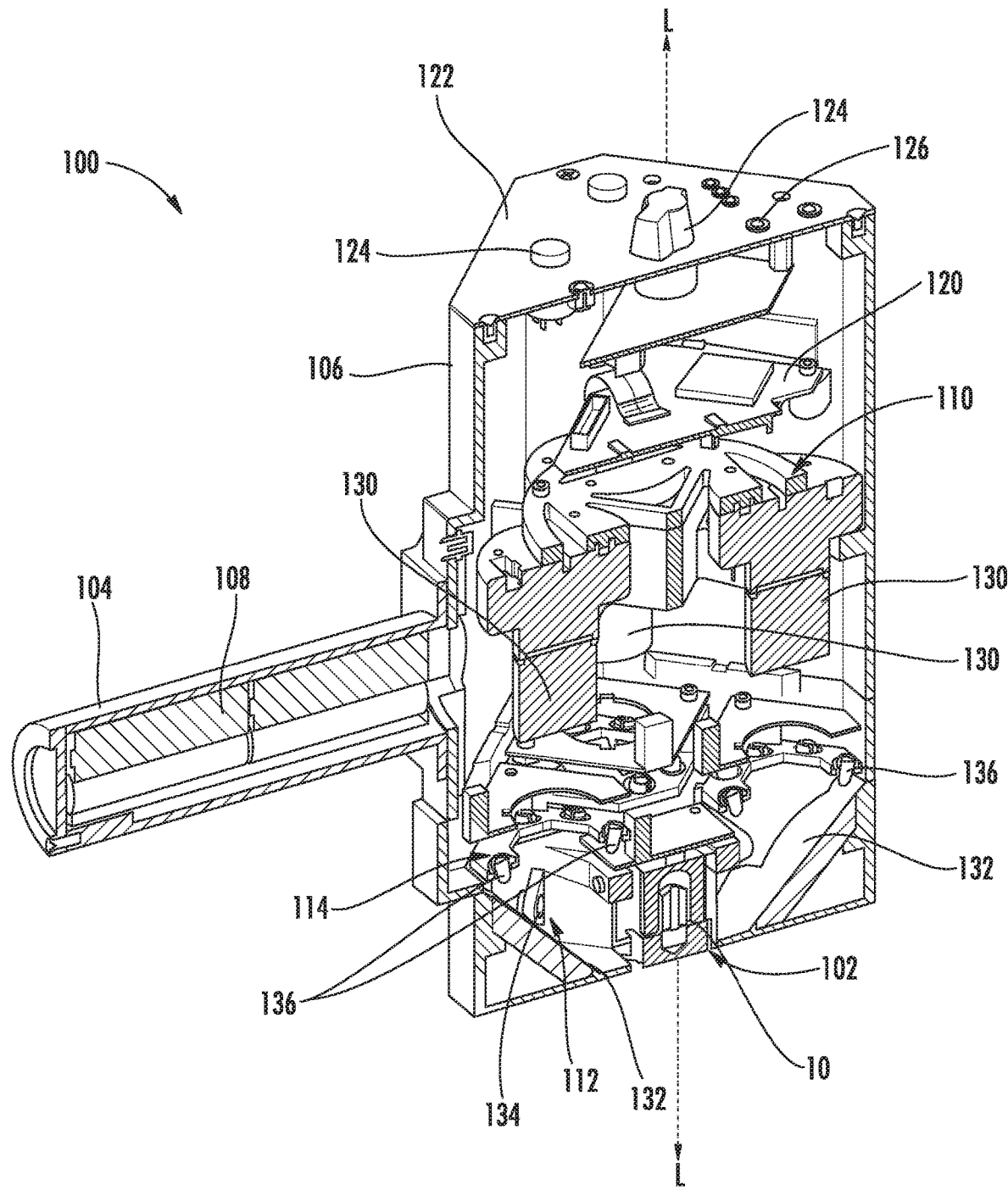
FIG. 5 provides a cross sectional view of the exemplary seal reader assembly of FIG. 4, taken along Line 5-5 of FIG. 4.

Referring now to FIGS. 4 and 5, a seal reader assembly 100 which may be used with tamper indicating device 10 according to an exemplary embodiment of the present subject matter is illustrated. Seal reader assembly 100 may generally be used for curing adhesive 46 and taking images (either reference or validation images) of tamper indicating device 10. According to the illustrated exemplary embodiment, seal reader assembly 100 is a handheld device defining a cavity 102 through which tamper indicating device 10 may be received for curing the adhesive and for taking images of seal housing 20, as described below.

Seal reader assembly 100 includes a handle 104 and a housing 106. Handle 104 includes an energy source, e.g., a battery pack 108, for powering seal reader assembly 100. Housing 106 encloses various components for operating seal reader assembly 100, such as a camera assembly 110, a lighting assembly 112, and a curing assembly 114, each of which will be described below. In addition, seal reader assembly 100 is further equipped with a controller 120 to regulate operation of seal reader assembly 100.

Controller 120 may be in communication (via for example a suitable wired or wireless connection) with camera assembly 110, lighting assembly 112, curing assembly 114, and other suitable components of seal reader assembly 100, as discussed herein. In general, controller 120 may be operable to configure seal reader assembly 100 (and various components thereof) for performing the adhesive curing and imaging functions of seal reader assembly 100. More specifically, controller 120 may regulate the operation of camera assembly 110, lighting assembly 112, and curing assembly 114 to cure adhesive 46, illuminate seal housing 20, and take images of seal housing 20.

By way of example, controller 120 may include one or more memory devices and one or more microprocessors, such as general or special purpose microprocessors operable to execute programming instructions or micro-control code associated with an operating cycle. The memory may represent random access memory such as dynamic random access memory (DRAM), or read only memory such as ROM or FLASH. In one embodiment, the processor executes programming instructions stored in memory. The memory may be a separate component from the processor or may be included onboard within the processor.

Controller 120 may be positioned in a variety of locations throughout seal reader assembly 100. In the illustrated embodiment, controller 120 may be located within housing 106 as shown in FIG. 5, and input/output (I/O) signals may be routed between the controller 120 and various operational components of seal reader assembly 100 along wiring harnesses that may be routed through housing 106. Typically, controller 120 is in communication with a user interface panel 122 through which a user may select various operational features and modes and monitor progress of seal reader assembly 100. In one embodiment, user interface 122 may represent a general purpose I/O (GPIO) device or functional block. In one embodiment, user interface 122 may include input components or controls 124, such as one or more of a variety of electrical, mechanical or electromechanical input devices including rotary dials, push buttons, and touch pads. User interface 122 may include a display component, such as a digital or analog display device or other visible indicators 126 designed to provide operational feedback to a user. Controller 120 can also be provided with other features and may be configured for performing other functions as will be further described herein.

As illustrated in FIG. 5, camera assembly 110 is configured for taking images of the illuminated seal housing 20 and the unique identifier generated by adhesive 46 on a side 26 of seal housing 20. According to an exemplary embodiment, two reference images are taken at each of the four sides 26 of seal housing 20. In this manner, eight total images are taken as a record of the unique identifier associated with each side 26 when illuminated from different angles (discussed below). To take these eight images, camera assembly includes four cameras 130. Each camera 130 is positioned within a quadrant of housing 106 and is associated with a respective side 26 of seal housing 20. Each camera 130 is aimed substantially along a longitudinal axis L of housing 106. Housing 106 also contains four mirrors 132 positioned adjacent seal housing 20 and angled at approximately 45 degrees relative to longitudinal axis L. In this manner, each camera 130 takes an image of a respective side 26 of seal housing 20 as reflected off of a respective one of four mirrors 132.

Notably, in order to obtain a more complex unique identifier for tamper indicating device 10, camera assembly 110 may take multiple images of each respective side 26 of seal housing 20 as that side 26 is illuminated by lighting assembly 112 from different angles. In this regard, each quadrant of housing 106 may also include two illuminating light emitting diodes (LEDs) 134 for illuminating a side 26 of seal housing 20 at different angles. For example, according to the illustrated exemplary embodiment, LEDs 134 are positioned and oriented such that they illuminate sides 26 of seal housing at 45 and negative 45 degrees relative to the surface of side 26. Illuminating seal housing 20 in this manner generates two different reflective signatures due to the reflective hematite particles in adhesive 46. It should be appreciated that one or more than two reference images of each side 26 may also be taken with different illumination angles to provide any suitable number of different reference images of tamper indicating device 10.

As explained above, adhesive 46 may be a UV adhesive that is cured, i.e., hardened, when exposed to UV light. Therefore, seal reader assembly 100 includes a curing assembly 114 configured for curing adhesive 46. Curing assembly 114 may include a plurality of UV LEDs 136 which are illuminated to cure adhesive 46. Although the exemplary embodiment includes UV adhesive cured by UV light, it should be appreciated that adhesive 46 could alternatively by any suitable adhesive that hardens after being expressed from adhesive cavity 44. According to some embodiments, seal reader assembly 100 may include heaters to accelerate the curing process of adhesive 46 or may include other means for curing adhesive 46.

Figure 6:
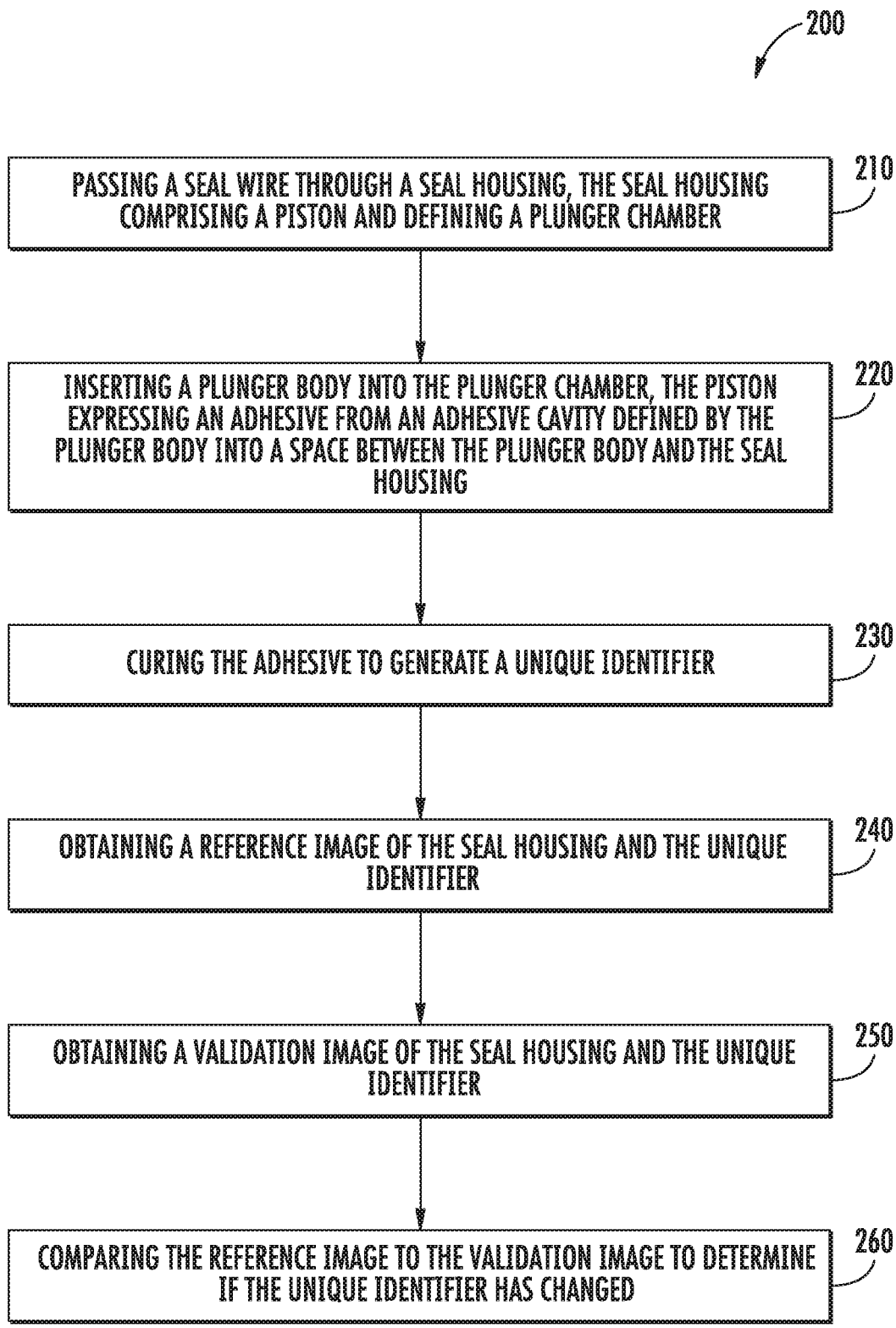
FIG. 6 provides a method for detecting tampering with a seal according to an exemplary embodiment of the present subject matter.

Now that the construction and configuration of tamper indicating device 10 and seal reader assembly 100 according to an exemplary embodiment of the present subject matter have been presented, an exemplary method 200 of operating these devices for detecting tampering with tamper indicating device 10 will be described. As illustrated in FIG. 6, method 200 includes, at step 210, passing a seal wire through a seal housing. For example, continuing the example from above, seal wire 12 may be passed through an item or container to be sealed and through seal housing 20. At step 220, a plunger body 40 is inserted into plunger chamber 28 such that piston 60 expresses adhesive 46 from adhesive cavity 44 defined by plunger body 40 into a space between plunger body 40 and seal housing 20. In this manner, as plunger body 40 is inserted into plunger chamber 28, piston 60 ruptures penetrable seal 50. As piston 60 advances into adhesive cavity 44, adhesive 46 is expressed through flow passageways 62 in piston 60 into annular chamber 42 between plunger body 40 and seal housing 20. Notably, plunger body 40 may further include snap ring 72 which serves to assist in securing seal wire 12 within plunger chamber 28. Plunger body 40 continues into plunger chamber 28 until snap ring engages, capturing seal wire 12 and locking the components of tamper indicating device 10 together.

Next, adhesive 46 is cured at step 230 to generate a unique identifier. In this regard, the adhesive 46 is hardened to create a permanent structure suspending a matrix of hematite particles. The resulting distribution of adhesive 46 and hematite particles generate a unique reflective signature that may be recorded for future comparison. More specifically, the unique identifier may include one or more images of tamper indicating device 10 taken from different angles and under different illumination conditions. The difference in the reflective signature created by the hematite particles in adhesive 46 being illuminated by different lighting angles provides a unique 3-D identifier of tamper indicating device 10. At step 240, this reflective signature is recorded by obtaining at least one reference image of seal housing 20 and the unique identifier generated by adhesive 46. Subsequently, at step 250, a validation image may be obtained of seal housing 20. At step 260, the reference image and the validation image may be compared to determine if the unique identifier has changed.

Figure 7:
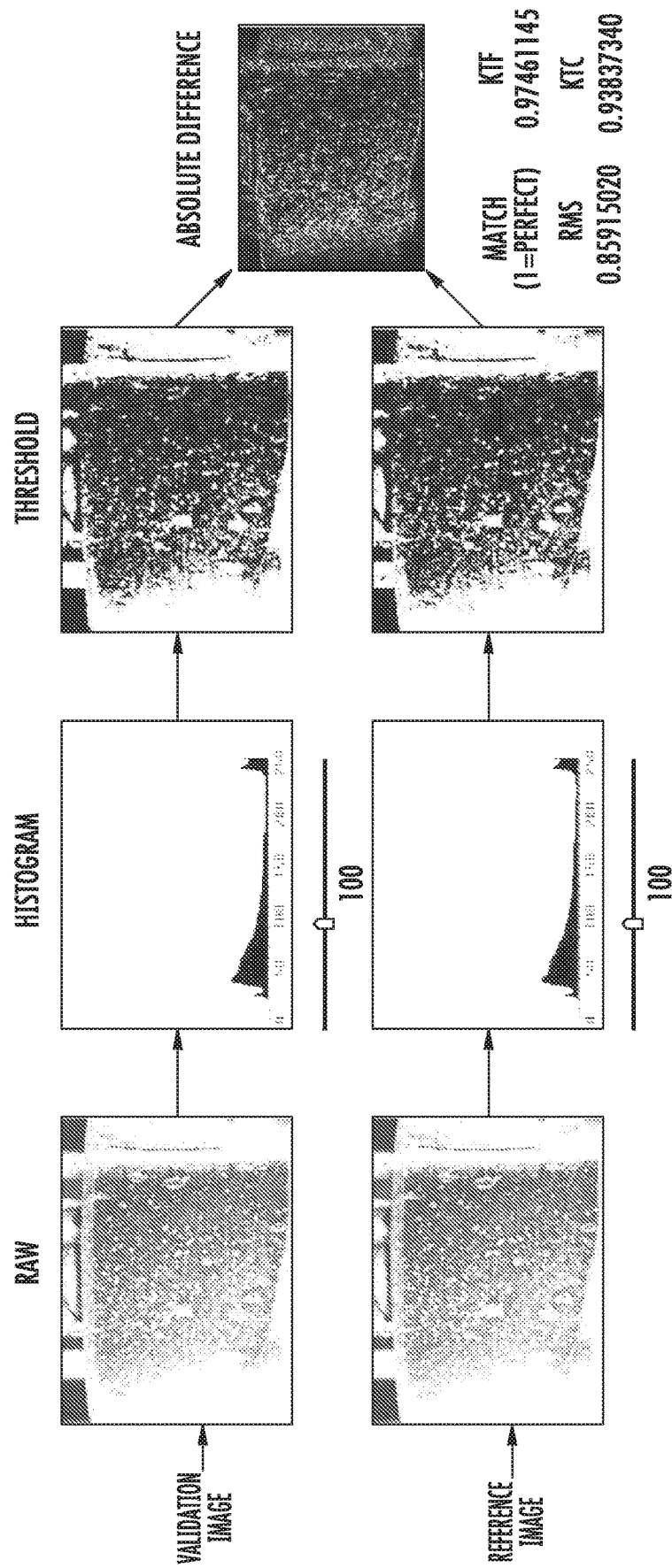
FIG. 7 provides an exemplary illustration of a comparison between a reference image and a validation image to detect tampering with a seal.

Referring now to FIG. 7, an exemplary illustration comparing a reference image and a validation image to detect tampering with tamper indicating device 10 is provided. More specifically, FIG. 7 shows a screenshot of a comparison between a reference image (taken when tamper indicating device 10 was installed) and a validation image (taken at some subsequent time to ensure that tampering has not occurred) of one face of seal housing 20. The raw images (left) are unedited photos from a high resolution camera. In order to eliminate any noise from the final comparison of the images, a threshold may be selected (center), and all pixels that have a brightness below the selected threshold may be set to zero (i.e., black). In other words, the threshold filters out everything but the brightest reflections. A pixel-by-pixel comparison is then made of the reference and validation images to determine their similarity. For example, by subtracting a brightness value of each pixel of the validation image from a brightness value of a corresponding pixel from the reference image, a perfect match should result in a black pixel. Thus, the Absolute Difference pane (far right) should be completely black if the reference and validation images are identical. An algorithm which performs statistical analysis may be used to generate a numerical score providing an indication of how similar the two images are. Based on that score, the operator may make a determination as to whether tamper indicating device 10 has been tampered with.

Thus tamper indicating device 10 provides a highly tamper-evident seal that creates a firm mechanical bond between seal wire 12 and seal housing 20 while simultaneously producing a unique identifier on each side 26 of seal housing 20. Tamper indicating device 10 also incorporates the use of reflective particles in a UV-cured adhesive and high resolution imaging at multiple illumination angles to provide an even more difficult to counterfeit unique identifier. The net effect is that any attempt to open, alter, or defeat tamper indicating device 10 will destroy the unique identifier, leaving detectable tamper indications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A loop seal tamper indicating device comprising:
    a seal wire;
    a seal housing for receiving the seal wire, the seal housing defining a plunger chamber;
    a plunger body configured for inserting into the plunger chamber, the plunger body defining an adhesive cavity containing an adhesive;
    a penetrable seal for containing the adhesive within the adhesive cavity; and
    a piston positioned within the seal housing, the piston being configured for puncturing the penetrable seal, engaging the adhesive cavity, and expressing the adhesive from the adhesive cavity and into the plunger chamber when the plunger body is inserted into the seal housing.

2. The loop seal tamper indicating device of claim 1, wherein the adhesive is an ultraviolet (UV) adhesive that is cured using UV light.

3. The loop seal tamper indicating device of claim 1, wherein the adhesive comprises reflective particles which form a unique identifier when the adhesive is cured.

4. The loop seal tamper indicating device of claim 3, wherein the reflective particles are hematite particles.

5. The loop seal tamper indicating device of claim 3, wherein the seal body comprises four sides, each of the four sides producing a unique identifier based on the distribution of the cured adhesive and the reflective particles cured therein.

6. The loop seal tamper indicating device of claim 1, wherein the piston defines channels through which adhesive may pass passes out of the adhesive cavity and into the plunger chamber when the plunger body is inserted into the plunger chamber.

7. The loop seal tamper indicating device of claim 1, further comprising a snap ring positioned between the plunger body and the seal housing for securing the seal wire.

8. The loop seal tamper indicating device of claim 1, wherein the penetrable seal is aluminum foil, the piston being configured for penetrating the aluminum foil as it engages the adhesive cavity.

9. The loop seal tamper indicating device of claim 1, wherein the seal housing and plunger body define an annular chamber which is filled with the adhesive as the plunger body is inserted into the seal housing.

10. The loop seal tamper indicating device of claim 1, wherein the seal housing is constructed from a transparent material.

11. A method for detecting tampering with a seal, the method comprising:
    passing a seal wire through a seal housing, the seal housing comprising a piston and defining a plunger chamber;
    inserting a plunger body into the plunger chamber, the plunger body defining an adhesive cavity filled with an adhesive that is contained within the adhesive cavity by a penetrable seal, the piston being configured for puncturing the penetrable seal, engaging the adhesive cavity, and expressing the adhesive from the adhesive cavity into a space between the plunger body and the seal housing;
    curing the adhesive to generate a unique identifier;
    obtaining a reference image of the seal housing and the unique identifier;
    obtaining a validation image of the seal housing and the unique identifier;
    comparing the reference image to the validation image to determine if the unique identifier has changed.

12. The method of claim 11, wherein the step of curing the adhesive comprises heating the seal housing.

13. The method of claim 11, wherein the step of curing the adhesive comprises exposing the adhesive to ultraviolet (UV) light.

14. The method of claim 11, wherein the seal housing is constructed of a transparent material, and the steps of obtaining a reference image and obtaining a validation image comprise taking photographs of the seal housing.

15. A tamper indication system comprising:
    a loop seal tamper indicating device comprising:
    a seal wire;
    a seal housing for receiving the seal wire, the seal housing comprising a piston and defining a plunger chamber; and
    a plunger body configured for inserting into the plunger chamber, the plunger body defining an adhesive cavity containing an adhesive and comprising a penetrable seal for containing the adhesive within the adhesive cavity, the piston being configured for puncturing the penetrable seal and engaging the adhesive cavity to express the adhesive from the adhesive cavity into the plunger chamber when the plunger body is inserted into the seal housing; and
    a seal reader assembly comprising:
        a lighting assembly that illuminates the seal housing at one or more angles; and
        a camera assembly that takes images of the illuminated seal housing.

16. The tamper indication system of claim 15, wherein the adhesive is an ultraviolet (UV) adhesive that is cured by UV light, and wherein the seal reader assembly further comprises one or more UV light emitting diodes (LEDs) for curing the UV adhesive.

17. The tamper indication system of claim 15, wherein the seal housing is a transparent cube, and wherein the camera assembly comprises four cameras, each of the four cameras being configured for taking images of a respective side of the transparent cube.

18. The tamper indication system of claim 17, wherein the lighting assembly comprises a plurality of LEDs configured for illuminating each of side of the transparent cube along two different angles, the camera assembly being configured for taking images as the transparent cube is illuminated from each of the two different angles.

19. The tamper indication system of claim 15, wherein the seal reader assembly is a handheld device defining a cavity through which the loop seal tamper indicating device is received for curing the adhesive and for taking images of the seal housing.

\* \* \* \* \*

UNITED STATES PATENT AND TRADEMARK OFFICE
CERTIFICATE OF CORRECTION

PATENT NO. : 10,679,523 B2  Page 1 of 1
APPLICATION NO. : 15/219388
DATED : June 9, 2020
INVENTOR(S) : George E. Weeks et al.

It is certified that error appears in the above-identified patent and that said Letters Patent is hereby corrected as shown below:

On the Title Page

Item (72) Inventors (should read): George E. Weeks, Trenton, SC (US);
Keith Tolk, Albuquerque, NM (US);
Jennifer E. Tanner, Richland, WA (US);
Jacob Benz, West Richland, WA (US);
Keir C. Allen, London, England (UK);
Helen M. White, Berkshire, England (UK);
Daniel Krementz, Augusta, GA (US);
Lawrence J. Harpring, North Augusta, SC (US);
Raymond R. Lawson, Aiken, SC (US)

Signed and Sealed this
First Day of September, 2020

Andrei Iancu
*Director of the United States Patent and Trademark Office*